May 13, 1958 A. H. HANSON 2,834,602
LIFT ASSEMBLY FOR HAND TRUCKS
Filed March 14, 1956 3 Sheets-Sheet 2

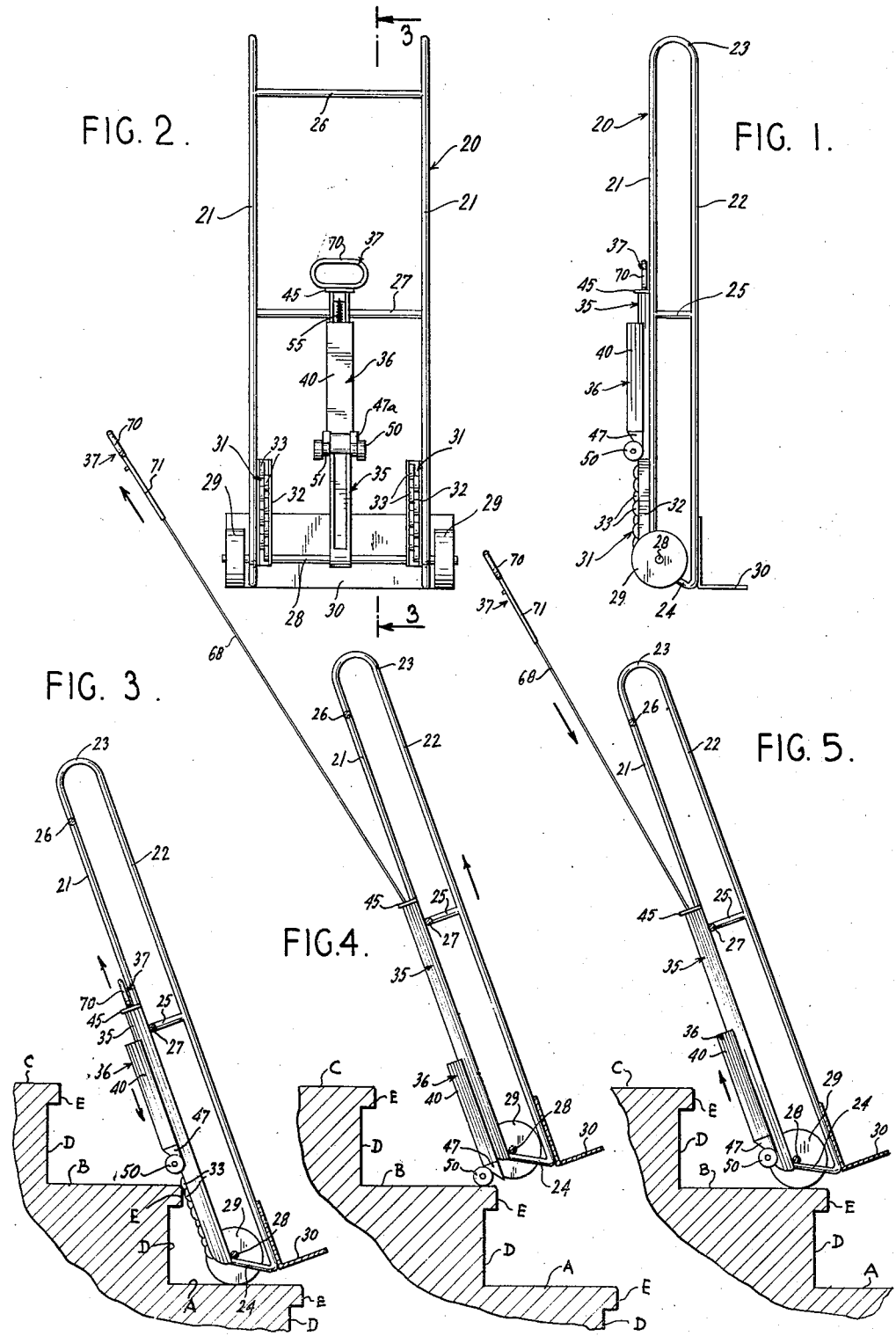

INVENTOR.
ALFRED H. HANSON
By Mock & Blum
ATTORNEYS

May 13, 1958 A. H. HANSON 2,834,602
LIFT ASSEMBLY FOR HAND TRUCKS
Filed March 14, 1956 3 Sheets-Sheet 3

INVENTOR.
ALFRED H. HANSON
BY
Mock + Blum
ATTORNEYS

United States Patent Office 2,834,602
Patented May 13, 1958

2,834,602

LIFT ASSEMBLY FOR HAND TRUCKS

Alfred H. Hanson, Garrison, N. Y., assignor to The Fairbanks Company, New York, N. Y., a corporation of New Jersey Application March 14, 1956, Serial No. 571,556

10 Claims. (Cl. 280—5.3)

My invention relates to improvements in hand trucks of the "appliance truck" type which are used for lifting heavy loads over vertical obstacles such as a truck tailgate or a flight of stairs. In particular, the invention relates to a lift unit for attachment to, or to be built in the hand truck for providing the operator with a large mechanical advantage in lifting the load vertically.

Appliance hand trucks are generally in the usual form of hand trucks having a frame and a pair of wheels at the bottom of the frame, except that each has at the rear of the frame a "glider" or "crawler" assembly which abuts the treads of a flight of stairs or the like, to provide a moving surface by means of which the truck and its load may be lifted up or lowered down the stairs.

It has been found, however, that even with such crawler or glider units to provide relatively friction-free movement of the hand truck along stair treads or over other obstacles, difficulty is still encountered in lifting heavy loads vertically up a flight of stairs or the like. While the reduction of friction in the sliding surfaces is beneficial, the vertical lift required to raise heavy loads is often difficult, if not impossible for a single man to accomplish.

It is an object of the present invention, therefore, to provide a lift unit for a hand truck which can be grasped and actuated by a single operator while he is in the act of lifting the truck up a flight of stairs or the like, and which will provide a high mechanical advantage in lifting the truck and its load.

Another object of the invention is to provide a lift unit of the type described which includes a housing fixed to the rear of the hand truck, a shoe slidable on the housing, cable and pulley means for lowering the shoe relative to the housing until the shoe engages the stair tread or the like, and then lifting the housing and the hand truck relative to the shoe and stair tread.

A further object of the invention is the provision of a lift unit of the character described in which the shoe includes rollers which automatically pivot outwardly to engage the stair tread well beyond its edge when the cable and pulley means is actuated.

A further object of the invention is the provision of a lift unit of the type described which is actuated by the operator while he is in the very act of pulling rearwardly on the hand truck so that no additional effort or separate operational steps are required.

Additional objects and advantages of the invention will become apparent in the course of the following specification when taken in connection with the accompanying drawings, in which:

Fig. 1 is a side elevation of a hand truck incorporating the lift assembly of the invention;

Fig. 2 is a rear plan view thereof;

Fig. 3 is a section taken along line 3—3 of Fig. 2 and showing the hand truck resting on a tread of a flight of stairs in position for actuation of the lift assembly;

Fig. 4 is a section similar to Fig. 3 but showing the lift assembly in its final stage of lifting the hand truck to the next succeeding step or tread;

Fig. 5 is a section similar to Fig. 4, but showing the lift assembly as it is returning to its original position;

Figure 8:
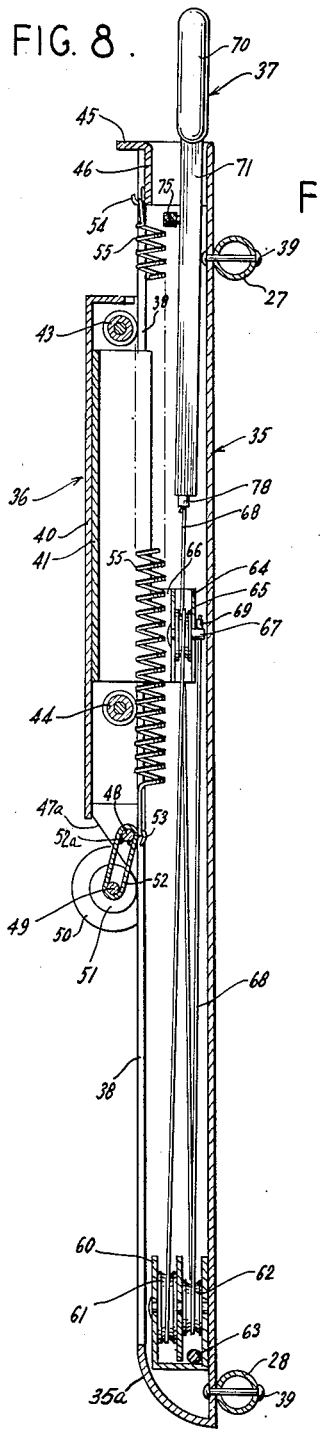
Fig. 8 is a section taken along line 8—8 of Fig. 7.

Referring in detail to the drawings, particularly Figs. 1 and 2, there is shown a hand truck having an open body frame 20 formed of tubular metal rods. The frame 20 comprises a pair of side elements or stringers, shown in Fig. 1, in the form of a pair of spaced, parallel, longitudinally extending tubular rods 21 and 22 joined at their top ends by an arcuate bight 23, at their bottom ends by a rod 24 inclined forwardly and downwardly, and by a central cross-rod 25.

The rear rods 21 of the stringers are connected at their upper ends by a cross bar 26. The central cross-rods 25 are connected by a cross bar 27 spaced a short distance inwardly from the rods 21, as shown in Figs. 3–5. The bottom rods 24 are connected by a cross bar 28 also spaced a short distance inwardly from the rods 21. This bottom cross bar 28 serves as the axle for the truck wheels, the wheels 29 being journalled on the ends of said bar 28, as shown in Fig. 1.

The front stringer rods 22 carry the usual nose-piece 30 at their bottom ends.

A glider unit 31 is fixedly secured, as by welding, to the lower end of each of the rear stringer rods 21. The particular glider units shown are of the type described and illustrated in my co-pending U. S. patent application Ser. No. 361,485, filed June 15, 1953, now issued as U. S. Patent No. 2,772,096 and each includes a channel-shaped housing 32 in which a plurality of roller elements 33 are mounted for individual rolling movement against the top wall of said housing. The roller elements 33 are arranged in two rows with the rollers in one row overlapping the rollers in the adjacent row, in such a manner that the rollers successively engage the edge of a stair tread or the like and provide a friction-free sliding surface, as fully described in said co-pending patent application.

The particular hand truck and glider units just described are shown herein merely for purposes of illustration, the lifting assembly being intended for use with any type of truck having a glider assembly of any suitable type.

As shown in Fig. 2, the lifting assembly of the present invention is mounted at the rear of the hand-truck midway between the stringers and the glider units 26. The lifting assembly broadly comprises a metal housing 35 fixed to the truck frame 20, a shoe 36 slidably mounted for movement along said housing, and a handle 37 for actuating the shoe 36.

Figure 7:
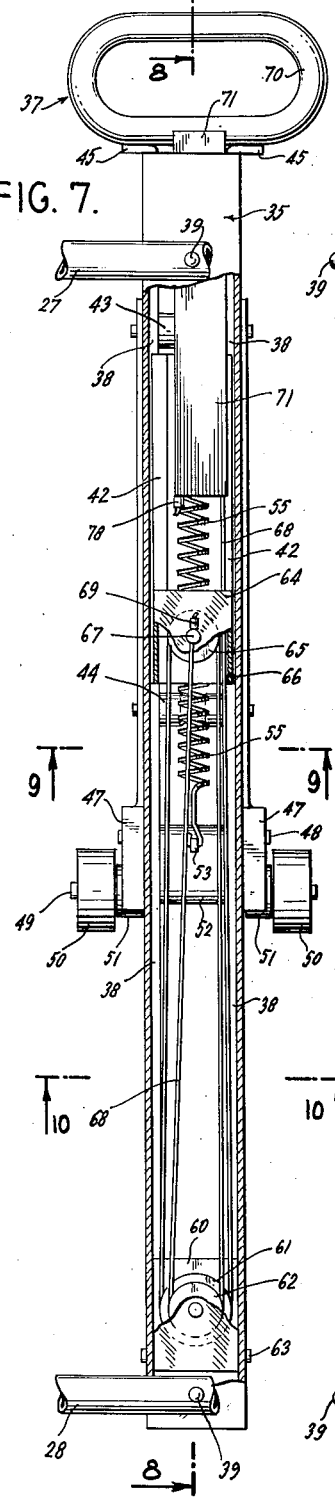
Fig. 7 is a rear plan view of the lift assembly shown in Fig. 6, with a portion of the casing broken away to reveal inner construction.
Figure 6:
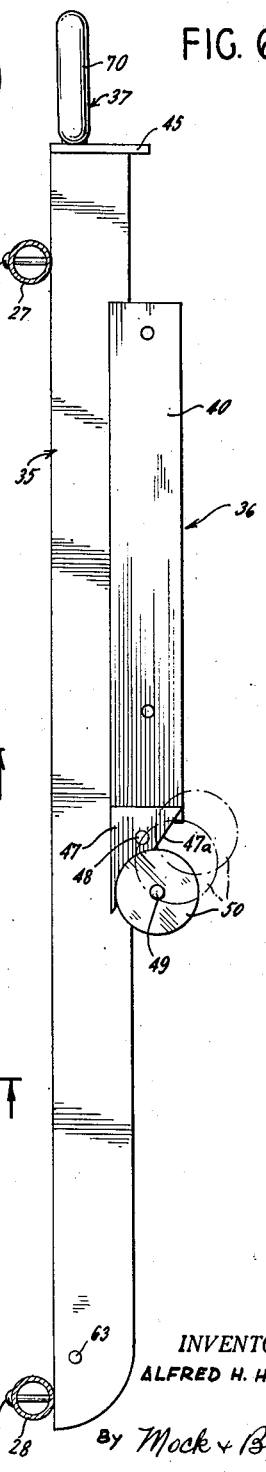
Fig. 6 is an enlarged side elevation of the lift assembly, the various positions of its roller being shown in phantom.
Figure 9:
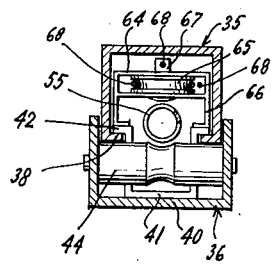
Fig. 9 is a section taken along line 9—9 of Fig. 7.
Figure 10:
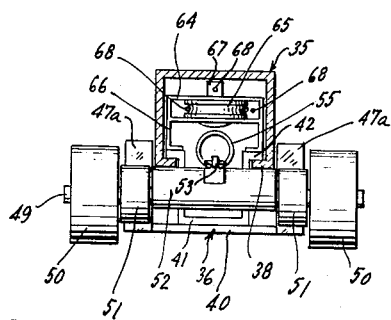
Fig. 10 is a section taken along line 10—10 of Fig. 7.

The housing 35 comprises an elongated metal box of rectangular channel shape, having an open rear end bordered by a pair of inwardly-turned flanges 38, as shown in Figs. 7, 9 and 10. The housing 35 is also open at its top end. The front wall of the housing 35 is fixed to the centers of cross bars 27 and 28 of the truck frame, as by rivets 39.

The shoe 36 has a channel-shaped outer casing 40 which is closed at its top end and open at its bottom end. Within the channel of the outer casing 40 a metal insert 41 of channel shape is secured. As shown in Figs. 7, 9 and 10, the insert 41 has at its open front end a pair of outwardly turned terminal flanges 42 which extend forwardly of and overlap the inwardly turned flanges 38 of the housing 35.

A pair of metal rollers 43 and 44 are journalled in the channel of shoe casing 40 respectively above and below the insert 41, as clearly shown in Fig. 8. These rollers 43 and 44 extend laterally across the rear open end of housing 35 and abut the outer surfaces of the housing flanges 38, as shown in Fig. 9. It will now be appreciated that the shoe 36 is slidable longitudinally along the length of housing 35, the rollers 43 and 44 providing smooth, relatively friction-free sliding bearings. The shoe 36 is restrained from inward lateral movement toward housing 35 by the rollers 43 and 44, and from outward movement away from housing 35 by the interfitting flanges 38 and 42. Downward movement of the shoe 36 relative to housing 35 is limited by the bottom wall 35a of said housing (Fig. 8). Upward movement of said shoe is limited by the outwardly projecting peripheral flange 45 of an insert 46 secured within the open top of the housing 35, or by abutment of the handle 37 against the top of flange 45, as will be presently explained.

A pair of angular metal plates 47 of identical size and shape are fixed to the bottom ends of the side walls of shoe casing 40, and depend parallel to each other from the bottom of said casing 40. The plates 47 are in the form of inverted right triangles, the lower wall 47a forming the hypotenuse defining an angle of 55° with the short, horizontal base leg. A rod 48 extends horizontally between the plates 47 and is fixed at its ends to said plates. The rod 48 extends through an elongated narrow metal sleeve 52. The sleeve 52 is pinched together beneath the rod 48, as shown at 52a in Fig. 8, so that while the sleeve may turn about the rod 48, it may not move longitudinally relative thereto. A cylindrical shaft 49 extends rotatably through the lower end of sleeve 52, said shaft 49 serving as an axle for a pair of rollers 50 and 51 mounted on each end thereof. The rollers 50 and 51 are mounted for independent rotation, that is to say, each outer roller is keyed to the shaft 49, while each inner roller 51 is freely rotatable on said shaft 49. The inner rollers 51 are positioned to abut and ride along the inclined bottom walls 47a of the triangular plates 47, as will be presently described, while the outer rollers 50 extend outwardly of and clear of the plates 47.

A hook 53 is fixed to or formed as an integral part of the metal sleeve 52 at the upper inner end thereof. A second hook 54 is carried by the top insert 46 at the front face thereof. As shown in Fig. 8, the ends of a coiled tension spring 55 are held by said hooks 53 and 54, so that the spring 55 extends vertically upward from the hook 53 and urges said sleeve in a counter-clockwise direction about rod 48. The spring 55 therefore serves to maintain the rollers 50 and 51 in the normal inoperative position shown in Fig. 8 in which the roller 51 is located at the lower end of inclined bottom wall 47a. Spring 55 also has the dual function of urging shoe 36 to its raised position relative to housing 35.

As shown in Fig. 9, the central portions of rollers 43 and 44 are of reduced diameter to allow clearance for the spring 55.

A pulley block 60 containing a pair of sheaves 61 and 62, is fixedly mounted within the housing 35 at the bottom thereof by means of a pin 63. A second pulley block 64 having a single sheave 65 is mounted on a bracket 66 which is integral with the lower end of the shoe insert 41. The sheave 65 is rotatably mounted on a pin 67 which projects forwardly beyond the block 64.

A single length of stranded flexible wire cable 68 is trained around the sheaves of the pulley. The cable 68 is connected at one end to the handle 37. The cable then extends down and around sheave 61, thence up and around sheave 65, then down and around sheave 62, and then up to block 64 where the end of cable 68 passes through a bore in the projecting end of pin 67 and is fixed thereto by a metal collar 69 which is pressed fast to the end of cable 68.

While the sheaves 61 and 62 in the lower block 60 are shown to be of various diameters, this is done merely for convenience of illustration and to enable the path of the flexible cable 68 to be followed in Fig. 7. It is to be understood that the sheaves 61 and 62 may be, and preferably are, of the same diameters.

Figure 14:
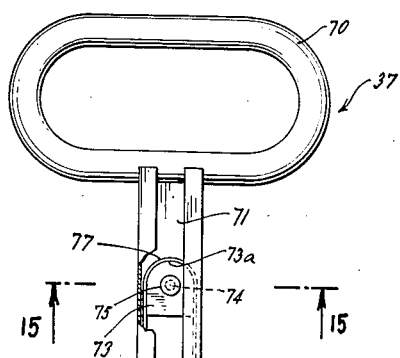
Fig. 14 is a plan view of the handle of the lift assembly.
Figure 15:
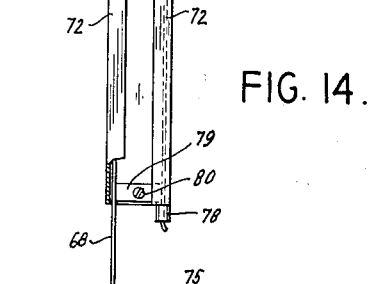
Fig. 15 is a section taken along line 15—15 of Fig. 14.

The handle 37 has a top ring 70 sized to enable the hand of the user to fit therethrough and a depending metal channel member 71 of generally flat rectangular configuration having a pair of inwardly extending flanges 72 at its rear open end. As shown in Figs. 14 and 15, a metal block 73 having an arcuate top end 73a, and being of slightly less width and depth than the channel of member 71, is mounted within said channel member 71. This mounting is accomplished by means of a set screw 74 which is threaded through block 73. The set screw has a knurled finger piece 75 for adjustment, and a pointed end 76.

The end of the flexible cable 68 extends upwardly through one side of channel member 71, passes around the arcuate top 73a of block 73 forming a bight 77, and then extends downwardly through the other side of channel member 71, as shown in Fig. 14. The free end of said cable 68 projecting below channel member 71 is secured by a metal collar 78 which is pressed tight around said cable end.

It will be appreciated that the block 73 is slidable vertically within the channel of member 71 for adjustment thereof. When the block is brought to a desired adjusted position, for a purpose which will be presently explained, the screw 74 is turned down through the block 73, its pointed end 76 pressing the front wall of channel member 71, thereby pressing the block 73 firmly against the rear surfaces of flanges 72, and locking the block 73 from further movement.

A stop plate 79 is secured across the bottom of channel member 71 by a screw 80. This stop plate 79 prevents the block 73 from falling or being pulled out of the bottom of channel member 71 when the screw 74 is loosened.

*Operation*

Figs. 3 to 5 show the hand truck in the operation of being raised up a flight of stairs having the usual treads A, B and C, risers D, and noses E.

In Fig. 3 the hand truck 20 is shown in an inclined attitude which is its normal position when carrying a heavy load. The angle of inclination may be greater or smaller than that shown depending on the type of load carried and the shape of the stairs to be traversed. The hand truck wheels 29, in Fig. 3, are resting upon the lowermost tread A, having been pulled rearwardly thereon as far as they will go since the upper rollers 33 of glider units 31 are in engagement with the nose. In this position, it will be observed that the rollers 50 of the lift assembly are directly above the forward edge of tread B.

Figure 11:
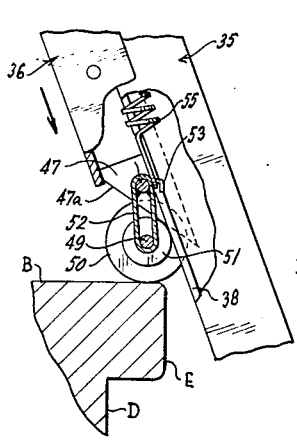
Figs. 11, 12 and 13, are partial views of the lift assembly showing three successive steps in the operation of the rollers thereof in engaging a stair tread.

In operating the lift assembly, the operator grasps one of the stringer top bights 23 or the top crossbar 26 with one hand and pulls upwardly thereon, while with the other hand he grasps the handle ring 70 and pulls upwardly thereon, thereby pulling the handle 37 and some of the cable 68 out of the top of the lift assembly housing 35. As the cable 68 within housing 35 is shortened, it lowers the pulley block 64 toward pulley block 60, and since the upper pulley block 64 is fixed to the shoe 36, said shoe 36 is lowered on assembly housing 35 until the rollers 50 engage the top of stair tread B. This position of the lift assembly is shown in detail in Fig. 11.

Figure 12:
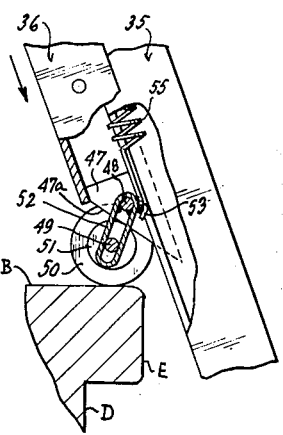

Further extension of handle 37 moves shoe 36 still further downwardly, and this movement causes the inner rollers 51 to ride up the inclined bottom surfaces 47a of the triangular plates 47, as shown in Fig. 12. During this travel of inner rollers 51, their axle rod 49 moves upwardly in sleeve 52, the latter swivelling about fixed rod 48. The sleeve 52 provides a moving or floating axis of rotation for the roller 51 which permits the roller 51 to roll up the inclined surface 47a and at the same time permits the outer roller 50 to remain on the stair tread. It will be appreciated that if the rollers 51 were attached to a pivoted bar of fixed length, downward movement of the shoe 36 would not insure that the rollers 50 would move outwardly along the stair tread. The inclined surfaces 47a coacting with the rollers 51 and their floating axis, however insures that the rollers 51 move outwardly, that is, away from the assembly housing 35.

Figure 13:
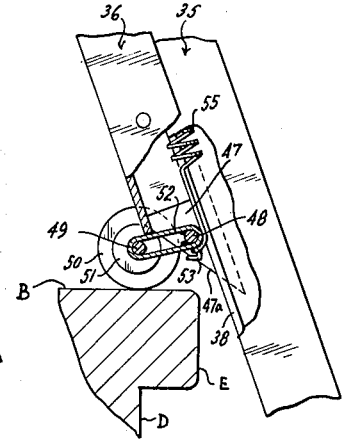

The shoe 36 is lowered relative to the housing 35 until the rollers 50 and 51 reach their furthest outward positions, as shown in Fig. 13. In this position, the sleeve 52 engages the rear wall of the shoe casing 40 and cannot pivot further upwardly. The axle rod 49 of the rollers is at the end of sleeve 52.

Since at the position of Fig. 13, the shoe 36 cannot move further downwardly toward the stair tread B, continued lifting of the handle 37 will lift the assembly housing 35. As handle 37 is lifted, additional cable is withdrawn from the housing 35, further shortening the distance between pulley blocks 60 and 64. At this time, the pulley block 64, being secured to the immovable shoe, becomes the fixed block, and the lower block 60 becomes the movable block. The lower block 60 as it is raised, carries with it the assembly housing 35 and the hand truck and load which is secured to said housing 35. It will be appreciated that since four cable strands carry the hand truck load, the pulley assembly shown herein will give a 4 to 1 mechanical advantage, so that an upward pull of approximately fifty pounds on the handle 37 will raise a two hundred pound load. At the same time, the operator is also lifting the truck frame with his other hand.

As the hand truck is raised, the rollers 33 of the glider units 31 traverse the corner of the nose E to provide a relatively friction-free bearing surface between the hand truck and the step, until the assembly housing 35 reaches its uppermost position relative to shoe 36, shown in Fig. 4. In this position, the hand truck wheels 29 have been raised vertically above the level of the stair tread B. The truck is pulled rearwardly on rollers 50 until the wheels 29 are directly above the stair tread and the handle 37 is then lowered. Lowering of the handle 37 permits tension spring 55 to raise the shoe 36 and return rollers 50 to their original positions, which brings the truck wheels 29 to rest upon the stair tread B. Further lowering of the handle 37 returns the shoe 36 to its original position of Fig. 3, the top ring 70 coming to rest upon the top flange 45 of the assembly housing 35, and preventing further upward movement of shoe 36.

In many instances, the upward force exerted by the operator in lifting the hand truck will be automatically translated into a rearward force as soon as the hand truck is raised to its uppermost position shown in Fig. 3. Consequently, the hand truck may be pulled rearwardly along the stair tread B until it engages the nose E of the next step, while the shoe 36 is still in its lowermost position of Fig. 4 or a partially lowered position such as shown in Fig. 5. The rear wall of shoe casing 40 will then come into contact with the corner of nose E. In such an event, further operation of the lift assembly is not retarded. The rear wall of shoe casing 36 being smooth and unbroken, it slides easily along the corner of nose E as the handle 37 is lowered and the shoe 36 is raised by spring 55. At the same time, the spring 55 also brings the rollers 50 back to their original retracted positions in which their rear circumferential surfaces are substantially aligned with the rear wall surface of shoe casing 40, as is shown clearly in Fig. 8. The rollers 50 thus also easily clear the stair nose E and the shoe 36 returns to its original raised position.

The hand truck is now pulled back to the step nose E and the operation may be repeated to lift the truck to the next tread C.

It will be noted that in the lifting of the hand truck, the entire weight of the truck and its load rests upon the rollers 50. Referring to Figs. 4 and 13, it can be seen that the rollers 50 during this lifting operation are spaced well inwardly on the stair treads, so that not only is a firm and steady base provided to prevent slipping, but the rollers 50 are positioned directly above the stair risers D, which is the strongest area on the tread.

Attention is also drawn to the location of the lift assembly which is closely adjacent the load to be carried by the hand truck. Thus the center of gravity of the load is always closely adjacent the rollers 51, so that the hand truck is balanced. Location of the lift assembly mid-way between the glider units 31 stabilizes the load from lateral deflection during the lifting operation, the glider units 31 providing an "out-rigger" stabilization.

As was previously described, the block 73 may be adjustably set within the channel of handle member 71 by means of the set screw 74. This is desirable in order to adjust the cable length to conform to the length of the operator's arm, and also to the height of the steps. To obtain the best possible leverage, the operator should raise the handle only to about shoulder level; above shoulder level, his body is no longer behind the pulling effort. Raising or lowering of the block 73 in the handle effectively shortens or lengthens the cable 68 so that a lesser or greater amount of cable must be withdrawn from the assembly housing 35 to raise said housing to its highest desired position. Since the cable 68 is doubled around block 73, movement of the block a specified distance will vary the cable length by twice that distance.

Whereas the above description of operation was confined to use of the lift assembly in lifting the hand truck vertically upwards, it will be appreciated that the assembly may be used to equal advantage in lowering the hand truck and its load vertically, particularly down a flight of stairs. Since the crawler units provide a friction-free surface, an attempt by a single operator to lower a two or three hundred pound load may cause him to lose control of the hand truck. Use of the lift assembly will enable the load to be lowered step-by-step in easy stages.

It is obvious that the lowering operation is performed in exactly the reverse manner as the lifting operation. For this purpose the lift assembly handle 37 is withdrawn until the shoe 36 is lowered and the rollers 50 engage the stair tread. The hand truck is then pushed forwardly on the rollers 50 until the wheels 29 are clear of the step nose, this position corresponding to the position shown in Fig. 4. The handle 37 is then lowered, lowering the assembly housing 35 and the hand truck, until the wheels 29 engage the next lower stair tread, and continued lowering of the handle 37 raises shoe 36 to its upper position, the hand truck being now in a position corresponding to that shown in Fig. 3.

The hand truck frame must now be pushed forward or tilted forward to enable the rollers 50 to clear the step nose E when the shoe 36 and rollers 50 are lowered to the next stair tread. The function of spring 55 in holding the rollers 50 in retracted position now again becomes important. Since the rollers 50 are retracted within the plane of shoe 36, it is only necessary to push or tilt the truck frame forwardly a short distance to permit the shoe 36 and rollers 50 to clear the step nose. Pushing or tilting the frame and its heavy load further forwardly, would bring the wheels 29 dangerously close to the edge of the step or would shift the center of gravity of the load dangerously forward.

While a preferred embodiment of my invention has been shown and described herein, it is obvious that numerous omissions, changes, and additions may be made in the embodiment shown without departing from the spirit and scope of the invention.

I claim:

1. In combination with an appliance hand truck having a frame, and at least one glider unit for traversing a raised surface, a lift assembly mounted at the rear of said hand truck, said lift assembly comprising a hollow housing secured to said truck frame and having a top open end, a shoe slidably mounted on the rear of said housing and having a hollow interior communicating with the interior of said housing, pulleys mounted within said housing and said shoe and being spaced longitudinally of said housing, a cable trained over said pulleys and connected at one end to said shoe, a handle at the top open end of said housing, connected to the other end of said cable, said handle being movable upwardly away from said housing to withdraw a portion of the cable out through the open end of said housing and decrease the distance between said pulleys, thereby sliding said shoe downwardly on said housing, said shoe being slidable on said housing between a normally-raised position above said glider unit and a lowered position below said glider unit, whereby said hand truck is lifted to the level of said raised surface upon a single upward movement of said handle, and spring means urging said shoe back to its normally-raised position.

2. In combination with an appliance hand truck having a frame, and a pair of glider units at the rear sides of the frame for traversing a raised surface, a lift assembly for lifting said hand truck vertically up said raised surface, said lift assembly comprising a hollow housing secured to the rear of the hand truck frame substantially mid-way between said glider units, and having a rear opening and a top open end, a shoe slidably mounted on the rear of said housing for movement axially of the hand truck frame, said shoe having a hollow interior and a front open end communicating with the rear open end of said housing, a pulley mounted at the bottom of said housing, a second pulley mounted on said shoe and projecting into the interior of said housing in substantial alignment with the housing pulley, a cable trained over said pulleys and connected at one end to said shoe, a handle at the top open end of said housing connected to the other end of said cable, said handle being movable upwardly away from said housing to withdraw a portion of the cable out through the top open end of said housing and decrease the distance between said pulleys, thereby sliding said shoe downwardly on said housing, means urging said shoe to a normally raised position on said housing, and means on said shoe for engaging and holding said shoe on said raised surface.

3. In combination with an appliance hand truck having a frame, a lift assembly comprising a hollow housing secured to the rear of said frame and having a top open end, a shoe slidably mounted on the rear of said housing for movement axially of the hand truck frame, means urging said shoe to a normal position at the upper end of said housing, a pulley mounted at the bottom of said housing, a second pulley mounted on said shoe and projecting into the interior of said housing in substantial alignment with the housing pulley, said housing pulley having two pulley sheaves, the shoe pulley having one sheave, a cable connected at one end to said shoe and being trained alternately over said housing pulley sheaves and shoe pulley sheave to provide four cable sections supporting the housing pulley, a handle at the top open end of said housing connected to the other end of said cable, said handle being movable upwardly away from said housing to withdraw a portion of the cable out through the top open end of said housing and decrease the distance between said pulleys, thereby sliding said shoe downwardly on said housing from its normally raised position, and means on said shoe for engaging and holding said shoe on said raised surface, said shoe having a front open end and a central channel-shaped insert having a pair of outwardly-turned flanges, the housing fitting within the front open end of the shoe and having a rear open end terminating in a pair of inwardly-turned flanges, said housing flanges interfitting with the flanges of said shoe insert to connect the shoe to said housing.

4. A lift assembly according to claim 3 in which a pair of spaced rollers are mounted transversely within the interior of said shoe, said rollers engaging the flange of said housing and providing bearings for the sliding movement of said shoe along said housing.

5. In combination with an appliance hand truck having a frame, a lift assembly for raising the hand truck vertically to a higher surface, said lift assembly comprising a housing secured to the rear of said frame, a shoe slidably mounted at the rear of said housing for movement axially of the hand truck frame, means urging said shoe to a normal position at the upper end of said housing, manually-operable means for lowering said shoe relative to said housing, and a pair of rollers mounted at the bottom end of said shoe, said rollers being of different diameters and being mounted on a common axle, said axle being movably mounted in a member pivoted to said shoe, said shoe having an inclined lower edge, engaged by the smaller of the two rollers, the larger roller being positioned to engage said higher surface when said shoe is lowered on said housing, the smaller roller rolling along the inclined lower edge of said shoe and the axle moving laterally in said pivoted member to permit said larger roller to roll rearwardly along said higher surface, said shoe having means to stop the pivoting of said member and halt downward movement of said shoe when said smaller roller reaches the end of said inclined shoe edge.

6. In combination with an appliance hand truck having a frame and glider means mounted on the rear of said frame for traversing a raised surface with the hand truck in a rearwardly-tilted position, a lift assembly for lifting said hand truck vertically up said raised surface, said lift assembly comprising a housing mounted at the rear of said truck frame and extending longitudinally thereof, a shoe slidably mounted on the rear of said housing for sliding movement along said housing axially of the truck frame, abutment means on said shoe projecting rearwardly of said truck frame for engagement with the raised surface, spring means normally urging said shoe to a raised position in which the abutment means is located above said glider means, a pulley assembly mounted in said housing and said shoe and including a plurality of pulleys and a cable coupling said pulleys and having a free end extending out of the top end of said housing and a handle connected to said cable end, said cable being arranged and adapted to actuate said pulley assembly for lowering said shoe when said handle is pulled upwardly away from the top of said housing with the pulley assembly providing a mechanical advantage, whereby to lower said shoe until said abutment means engages said raised surface, continued upward pulling on said handle raising said housing and hand truck frame relative to said shoe with the glider means travelling up along said raised surface until the bottom end of said hand truck reaches the level of said raised surface, said spring means returning said housing to its raised position when said handle is released.

7. In combination with an appliance hand truck having a frame and glider means mounted on the rear of the frame for engaging and traversing the steps of a flight of stairs with the hand truck in a rearwardly-tilted position, a lift assembly for lifting said hand truck vertically from a lower step to the next succeeding higher step, said lift assembly comprising a housing mounted at the rear of said truck frame and extending longitudinally thereof, a shoe slidably mounted on the rear of said housing axially of the truck frame, abutment means on said shoe projecting rearwardly of the truck frame for engagement with said higher step, spring means normally urging said shoe to a raised position in which the abutment means is located above said glider means, a pulley assembly mounted in said housing and said shoe and including a plurality of pulleys and a cable coupling said pulleys and having a free end extending out of the top end of said housing, and a handle connected to said cable end, said cable being arranged and adapted to actuate said pulley assembly for lowering said shoe when said handle is pulled upwardly away from the top of said housing with the pulley assembly providing a mechanical advantage, whereby to lower said shoe until said abutment means engages said higher step, continued upward pulling of said handle raising said housing and hand truck frame relative to said shoe with the glider means travelling up along said higher step until the abutment means is located below the glider means and the bottom end of said hand truck reaches the top surface of said upper step, said spring means returning said housing to its raised position when the handle is released.

8. A lift assembly according to claim 7 in which said abutment means comprises a roller mounted on the lower end of said shoe on a movable axle, said spring means being connected to said roller and normally maintaining said roller in a retracted position substantially in alignment with said shoe, said roller being engageable with the upper surface of said higher step when said shoe is lowered, and an inclined cam surface on said shoe, said movable axle riding along said cam surface to move said roller rearwardly upon engagement of the latter with said step upper surface, whereby said roller is spaced rearwardly from the housing and inwardly of the edge of said higher step.

9. A lift assembly according to claim 7 in which said handle comprises an upper grip member and a depending hollow extension, the latter fitting within the top end of said housing, the end portion of said cable extending within said hollow extension and being secured thereto, and means within said hollow extension for adjustably varying the effective length of said cable in accordance with the height of the stair steps.

10. A lift assembly according to claim 7 in which said handle comprises an upper grip member, a depending hollow extension sized to fit within the upper end of the housing, and a block movably mounted within the hollow extension, the end portion of said cable extending within the hollow extension and around the top and sides of the block with the end of said cable fixed to said handle extension, the block being slidable longitudinally within the hollow extension to vary the effective length of the cable in accordance with the height of the stair steps, and screw means for releasably holding said block in an adjusted position.

References Cited in the file of this patent

UNITED STATES PATENTS

| | | |
|---|---|---|
| 887,821 | Lang | May 19, 1908 |
| 2,123,707 | Bloch | July 12, 1938 |
| 2,181,979 | Schaeffer | Dec. 5, 1939 |
| 2,358,007 | Henley | Sept. 12, 1944 |
| 2,508,679 | McCellan et al. | May 23, 1950 |
| 2,701,005 | Bennett et al. | Feb. 1, 1955 |
| 2,733,074 | Fuglie et al. | Jan. 31, 1956 |
| 2,740,637 | Cononelos | Apr. 3, 1956 |